L. S. LANCASTER.
Seed-Planter.

No. 25,513.

2 Sheets—Sheet 1.

Patented Sept. 20, 1859.

L. S. LANCASTER.
Seed-Planter.

No. 25,513.

Patented Sept. 20, 1859.

UNITED STATES PATENT OFFICE.

LEVI L. LANCASTER, OF ROCKY MOUNT, NORTH CAROLINA.

IMPROVEMENT IN SEED-PLANTERS.

Specification forming part of Letters Patent No. 25,513, dated September 20, 1859.

*To all whom it may concern:*

Be it known that I, LEVI L. LANCASTER, of Rocky Mount, in the county of Edgecombe and State of North Carolina, have invented a new and useful Improvement in Seed-Planters; and I do hereby declare that the following is a full, clear, and exact description of the construction and operation of the same, reference being had to the annexed drawings, making a part of this specification, in which—

Figure 1:
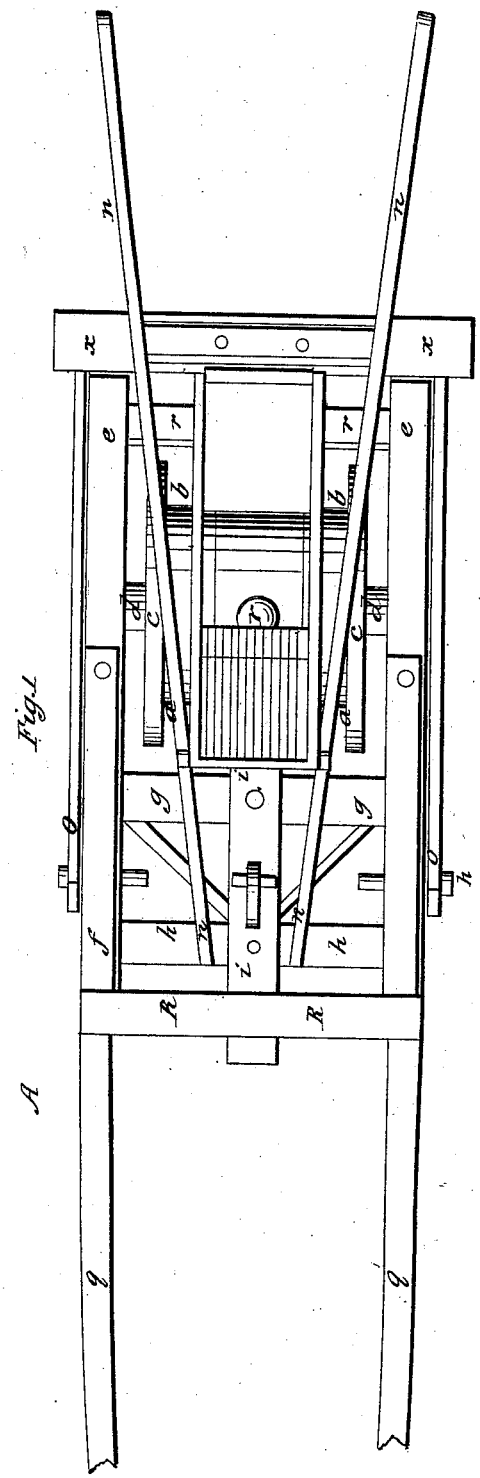
Figure 2:
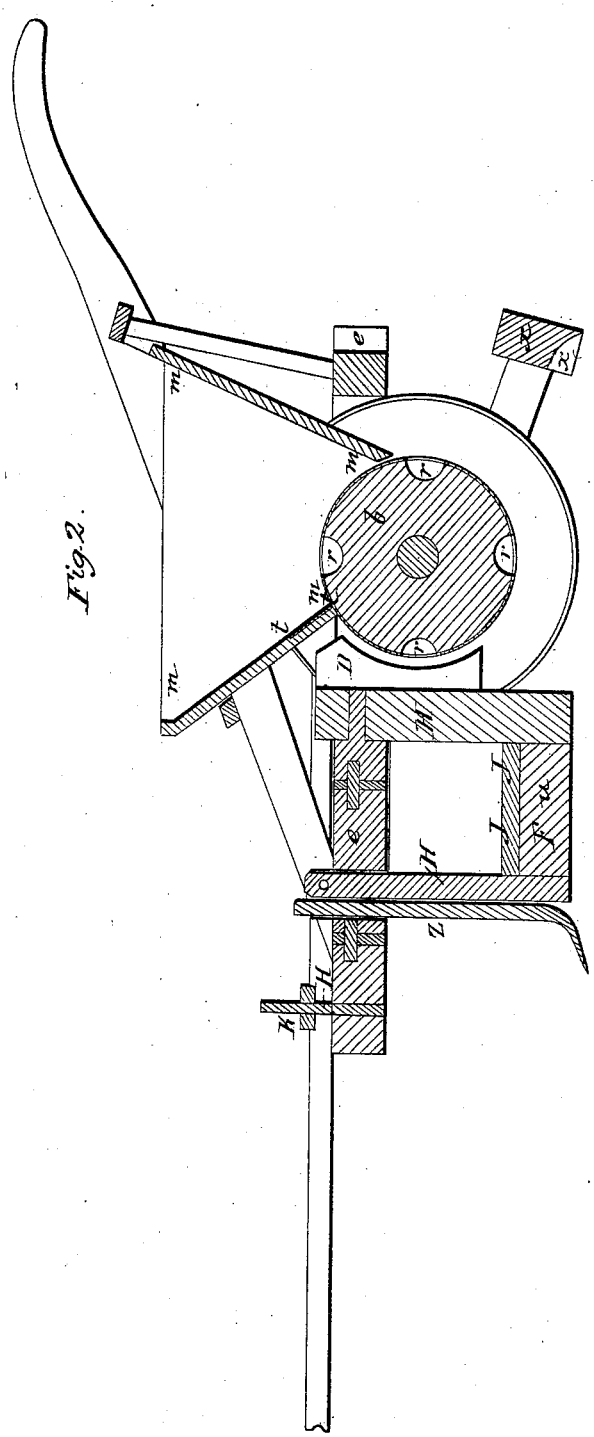

Figure 1 is a plan view; Fig. 2, a longitudinal central section.

The nature of my invention consists in the arrangements of devices hereinafter described.

e is a wooden frame, of oblong shape, as seen in the drawings, of dimensions sufficient to admit two wheels, c c, to be placed on the inside of the same and leave sufficient space to receive the hopper m between them. The wheels are permanently fixed on a shaft, which runs on bearings attached to the under side of frame e. On the center of the shaft is a cylinder, b, with pockets or depressions r for the purpose of conveying the seeds in proper quantities from the hopper m to the conveying-tube D, which deposits the seeds in the furrow made by the opener F u.

X is a coverer, with arms extending to within a short distance of the front end of the machine, where they are pivoted loosely to frame e by bolts p.

Z is the colter in advance of the furrow-opener.

H H represent a leveler or clearer; I I, the bottom of the same, which is for the purpose of leveling off the ground on each side of the furrow-opener as the machine passes along.

This machine is simple in construction, easily kept in repair, and performs well in practice.

What I claim as my invention, and desire to secure by Letters Patent, is—

The frame e, wheels c c, hopper m, cylinder b, pockets or depressions r, conveying-tube D, furrow-opener F u, colter Z, leveler H H, and bottom I I, the whole being arranged for operation conjointly, as and for the purposes herein described.

LEVI L. LANCASTER.

Witnesses:
B. BRADLEY,
R. S. PITWAY.